US011503327B2

United States Patent
Li et al.

(10) Patent No.: US 11,503,327 B2
(45) Date of Patent: Nov. 15, 2022

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiaozhong Xu, State College, PA (US); Shan Liu, San Jose, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/678,149

(22) Filed: Nov. 8, 2019

(65) Prior Publication Data

US 2020/0077114 A1 Mar. 5, 2020

Related U.S. Application Data

(63) Continuation of application No. 16/200,569, filed on Nov. 26, 2018, now Pat. No. 10,506,251.
(Continued)

(51) Int. Cl.
*H04N 19/105* (2014.01)
*H04N 19/176* (2014.01)
(Continued)

(52) U.S. Cl.
CPC .......... *H04N 19/52* (2014.11); *H04N 19/105* (2014.11); *H04N 19/176* (2014.11); *H04N 19/184* (2014.11)

(58) Field of Classification Search
CPC combination set(s) only.
See application file for complete search history.

(56) References Cited

U.S. PATENT DOCUMENTS 8,526,495 B2   9/2013   Liu et al.
9,049,452 B2   6/2015   Liu et al.
(Continued)

FOREIGN PATENT DOCUMENTS

WO   2017/200771 A1   11/2017
WO   WO 20171197124   11/2017

OTHER PUBLICATIONS

International Search Report and Written Opinion dated Jun. 17, 2019 in corresponding International Application No. PCT/US2019/029290 filed Apr. 26, 2019 (9 pages).
(Continued)

*Primary Examiner* — Jeffery A Williams
(74) *Attorney, Agent, or Firm* — ArentFox Schiff LLP

(57) ABSTRACT

A method for video decoding includes decoding prediction information of a current block from a coded video bitstream, the prediction information being indicative of a prediction mode that is based on a candidate list. The method includes constructing, in response to the prediction mode, the candidate list that includes a plurality of side candidates that includes (i) a first side candidate having a first corner that is at a middle point of a side of the block and a second corner that is one of above and below the middle point of the side of the block, and (ii) a second side candidate located between the first side candidate and a corner block neighboring the current block. The method further includes reconstructing at least one sample of the current block according to motion information from the plurality of side candidates.

20 Claims, 16 Drawing Sheets

Related U.S. Application Data

(60) Provisional application No. 62/668,776, filed on May 8, 2018.

(51) Int. Cl.
  *H04N 19/184* (2014.01)
  *H04N 19/52* (2014.01)

(56) References Cited

U.S. PATENT DOCUMENTS

| | | | |
|---|---|---|---|
| 9,510,012 | B2 | 11/2016 | Liu et al. |
| 9,813,726 | B2 | 11/2017 | Liu et al. |
| 9,961,358 | B2 | 5/2018 | Liu et al. |
| 2012/0236941 | A1* | 9/2012 | Lin ............... H04N 19/52 375/240.16 |
| 2012/0236942 | A1 | 9/2012 | Lin et al. |
| 2017/0332095 | A1 | 11/2017 | Zou |
| 2017/0332099 | A1* | 11/2017 | Lee ............... H04N 19/52 |
| 2018/0098086 | A1 | 4/2018 | Chuang |
| 2018/0227593 | A1* | 8/2018 | Chen ............... H04N 19/176 |
| 2018/0255295 | A1* | 9/2018 | Lee ............... H04N 19/157 |

OTHER PUBLICATIONS

Liu et al., "Nonlinear motion-compensated interpolation for low-bit-rate video," in Applications of Digital Image Processing XXIII, vol. 4115, p. 203-214, Dec. 2000.
Liu et al., "MCI-embedded motion-compensated prediction for quality enhancement of frame interpolation," in Multimedia Systems and Applications III, vol. 4209, p. 251-262, Mar. 2001.
Liu et al., "Video Coding via Adaptive Selection of Generalized Motion Prediction Modes for B Frames," in the Picture Coding Symposium 2001, Seoul, Korea, Apr. 25-27, 2001.
Sullivan et al., "Overview of the high efficiency video coding (HEVC) standard," IEEE Transactions on Circuits and systems for Video Technology, vol. 22, No. 12, pp. 1649-1668, Dec. 2012.
Yang, et al., "Description of Core Experiment 4 (CE4): Inter prediction and motion vector coding," ISO/IEC JTC1/SC29/WG11 JVET-J1024, Apr. 2018.
Xu, et al., "Non-CE2: Intra BC merge mode with default candidates," ISO/IEC JTC1/SC29/WG11 JCTVC-S0123,Oct. 2014.
Xu, et al, "CE2: Test 3.2—Intra BC merge mode with default candidates," ISO/IEC JTC1/SC29/WG11 JCTVS-T0073, Feb. 2015.
The extended European search report dated Jan. 14, 2021 in corresponding European Patent Application No. 19799425.4 (10 pages).
Li et al.,"CE4-related: extension of merge and AMVP candidates for inter prediction", Joint Video Experts Team (JVET) of ITU-T SG 16 WP 3 and ISO/IEC JTC 1/SC 29/WG 11 11th Meeting: Ljubljana, SI, Jul. 10-18, 2018, XP030199447 (5 pages).
Chih-Wei Hsu, et al., Description of SDR video coding technology proposal by MediaTeK, Joint Video Experts Team (JVET) of ITU-T SG 16 WP 3 and ISO/IEC JTC 1/SC/WG 11. JVET-J0018, 10th Meeting: San Diego, US, Apr. 2018, pp. i-iii, 1-12.
Office Action dated Nov. 22, 2021 in Japanese Patent Application No. 2020-554476, with concise English translation.

\* cited by examiner

METHOD AND APPARATUS FOR VIDEO CODING

INCORPORATION BY REFERENCE

This present disclosure is a continuation of U.S. application Ser. No. 16/200,569, which claims the benefit of priority to U.S. Provisional Application No. 62/668,776, "METHODS FOR MERGE AND MOTION VECTOR PREDICTION SPATIAL CANDIDATE LIST FOR INTER-PICTURE PREDICTION" filed on May 8, 2018, each of which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video decoding. In some examples, an apparatus includes receiving circuitry and processing circuitry. The processing circuitry is configured to decode prediction information of a block from a coded video bitstream. The prediction information is indicative of a prediction mode that is based on a candidate list. Further, the processing circuitry constructs, in response to the prediction mode, the candidate list that includes at least one side candidate that is located at a neighboring position to the block between two corner positions of the block. Then, the processing circuitry reconstructs at least one sample of the block according to motion information of the side candidate.

In some embodiments, the prediction mode is one of a merge mode and an advanced motion vector prediction (AMVP) mode.

In an embodiment, the processing circuitry constructs, in response to the prediction mode, the candidate list that includes a left side candidate that is located at a left side middle position neighboring to the block when a height of the block is larger than a height threshold.

In another embodiment, the processing circuitry constructs, in response to the prediction mode, the candidate list that includes a top side candidate that is located at a top side middle position neighboring to the block when a width of the block is larger than a width threshold.

In another embodiment, the processing circuitry constructs, in response to the prediction mode, the candidate list that includes a plurality of left side candidates that are evenly spaced at a left edge neighboring to the block when a height of the block is larger than a height threshold.

In another embodiment, the processing circuitry constructs, in response to the prediction mode, the candidate list that includes a plurality of top side candidates that are evenly spaced at a top edge neighboring to the block when a width of the block is larger than a width threshold.

In an example, the processing circuitry prioritizes the side candidate before corner candidates in the candidate list. In another example, the processing circuitry prioritizes a left side candidate before a top side candidate in the candidate list. In another example, the processing circuitry prioritizes a top side candidate before a left side candidate in the candidate list.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
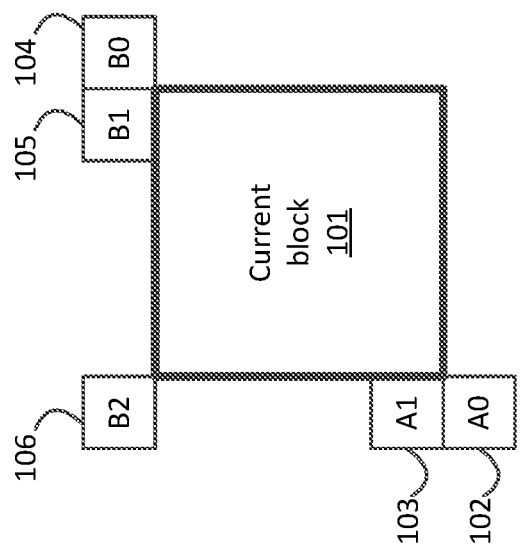
FIG. 1 is a schematic illustration of a current block and its surrounding spatial merge candidates in accordance with H.265.
Figure 2:
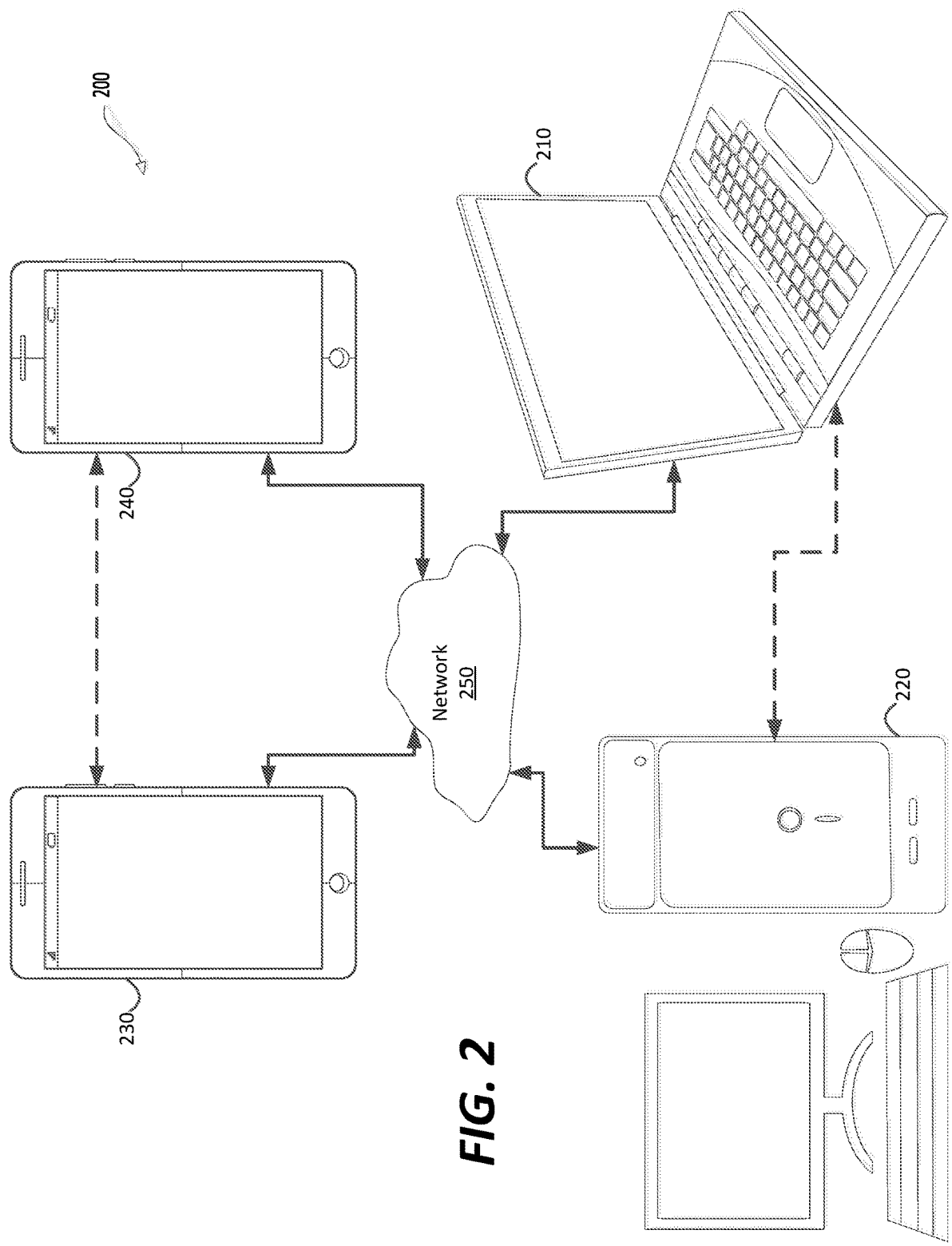
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
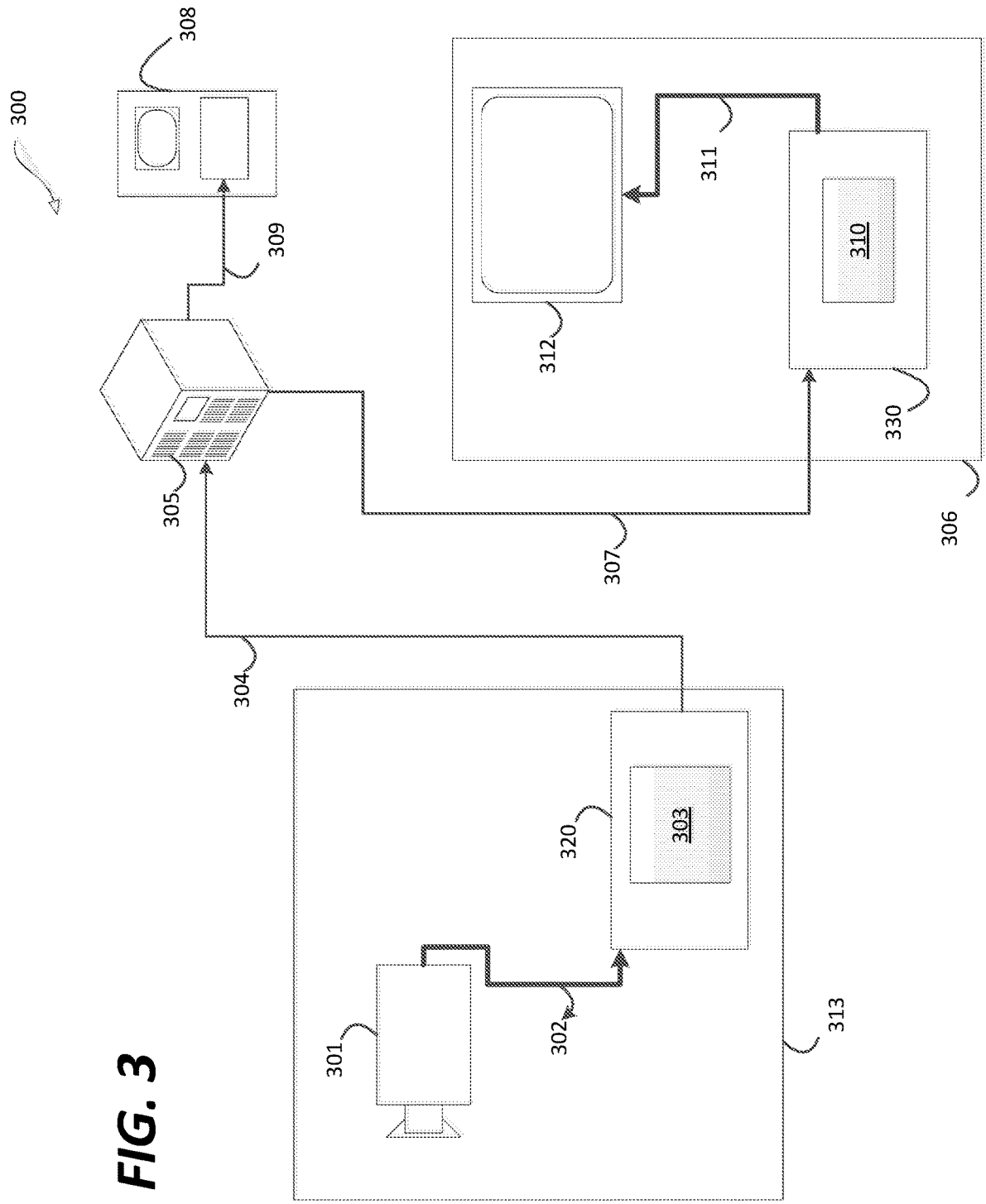
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
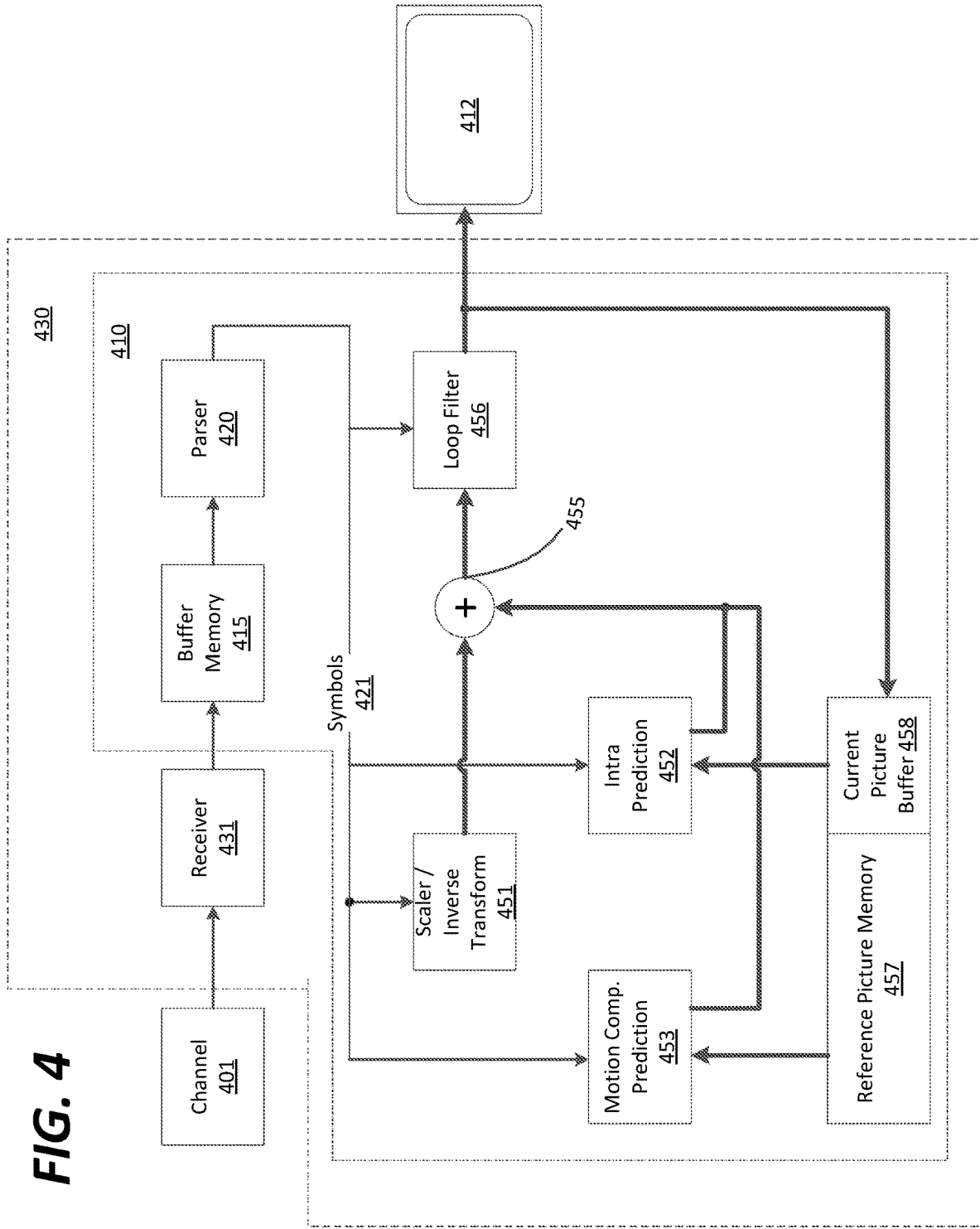
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
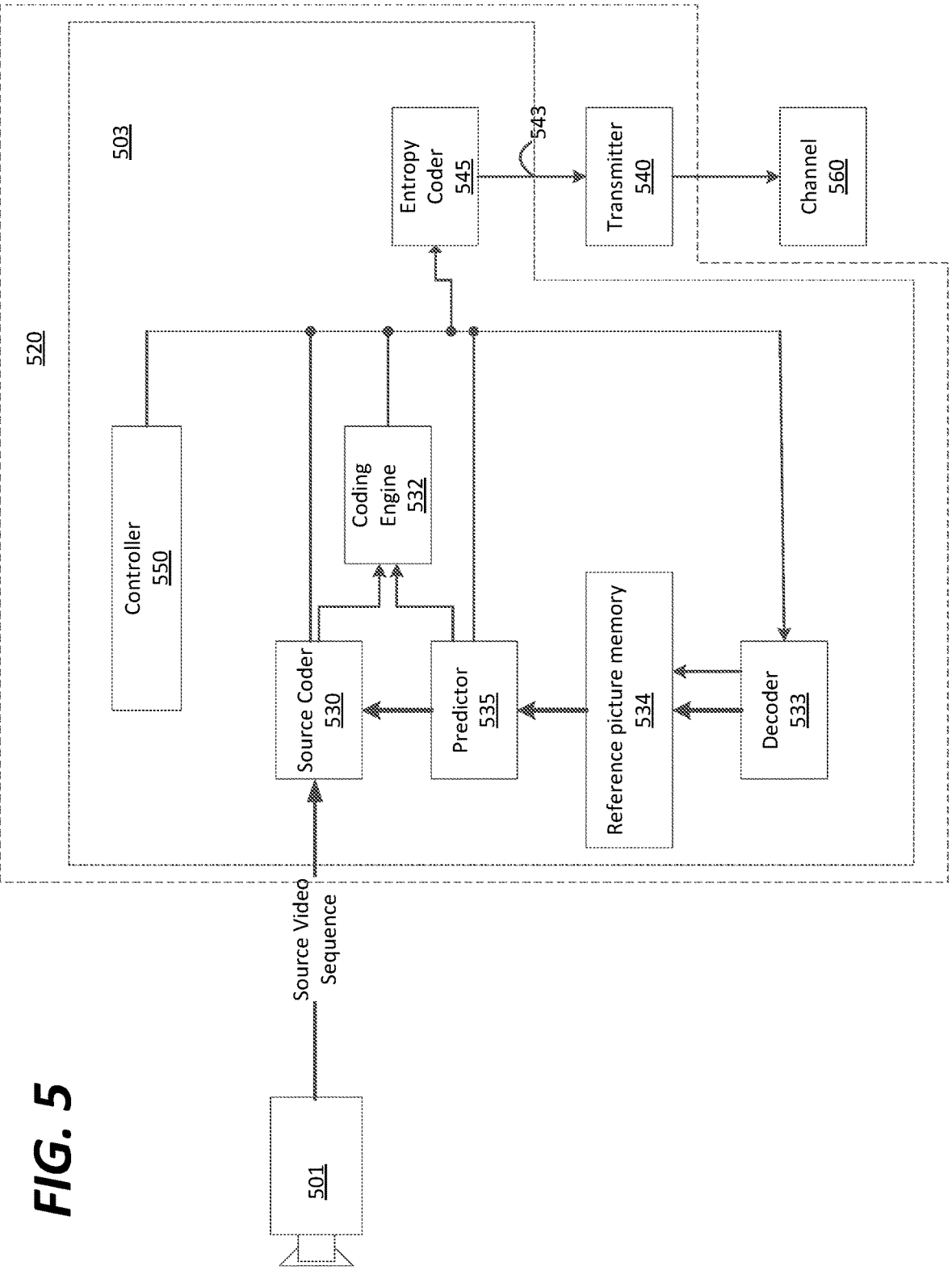
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
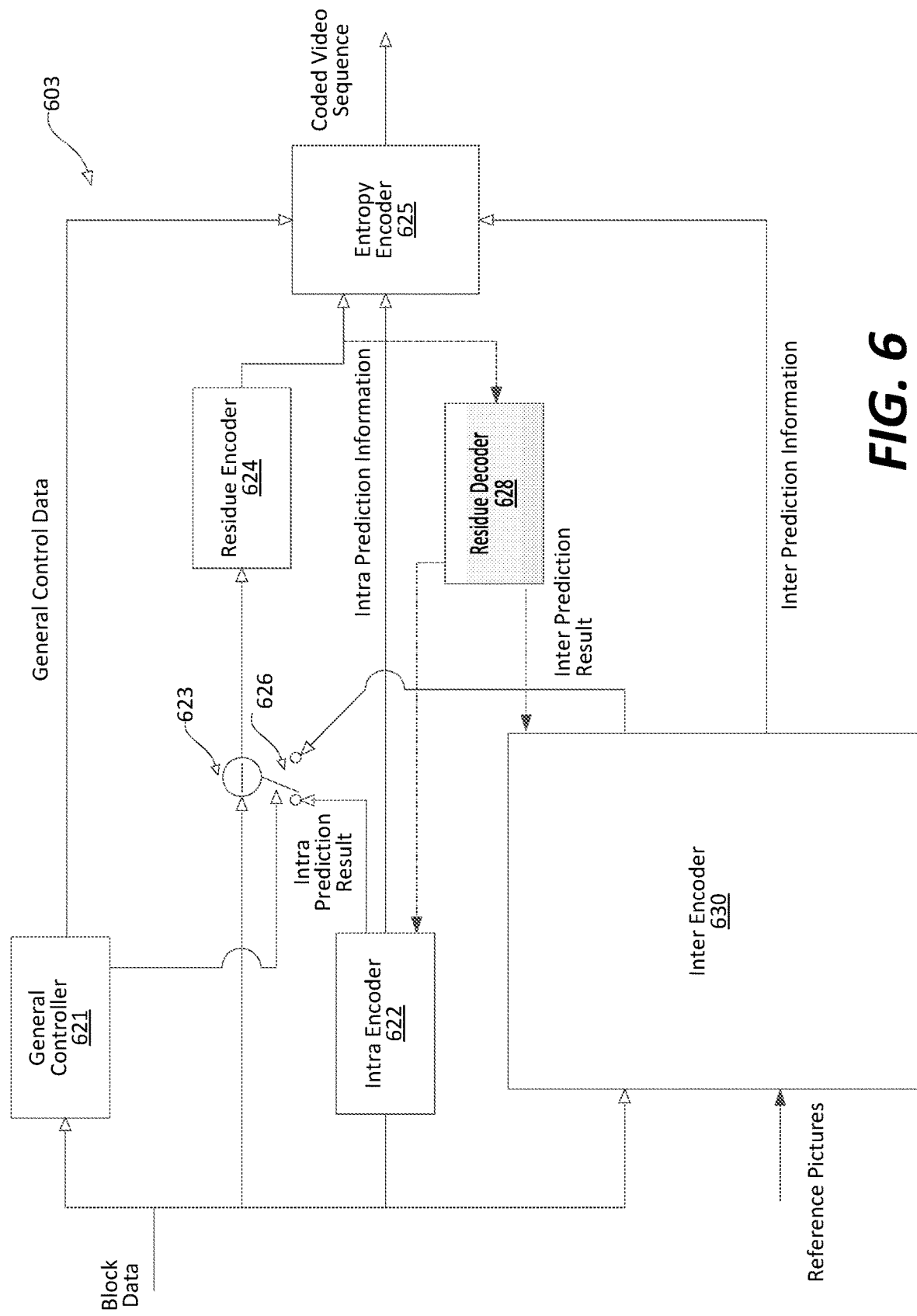
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
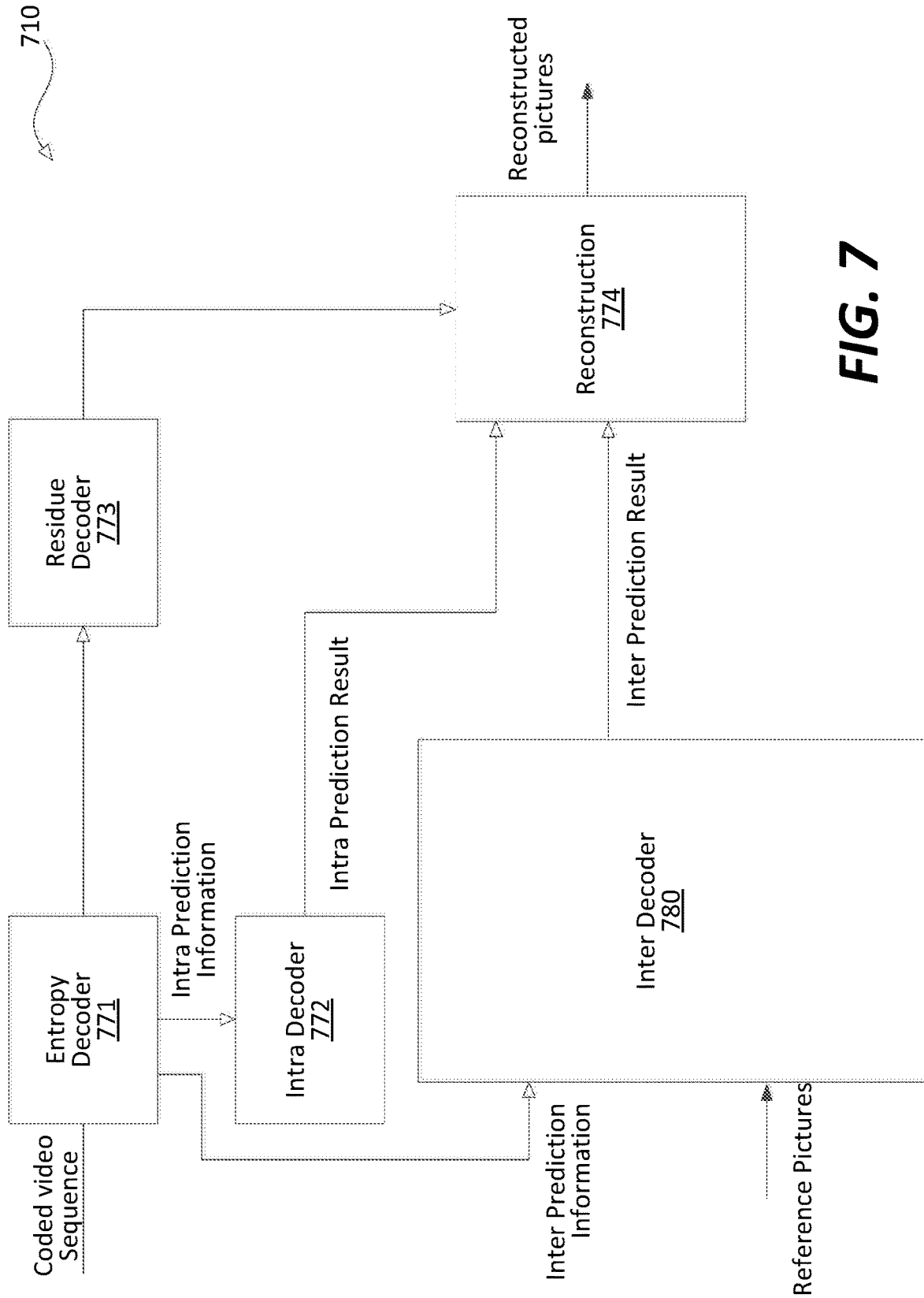
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for constructing spatial candidate list of motion vector prediction for the inter picture prediction.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

Figure 8:
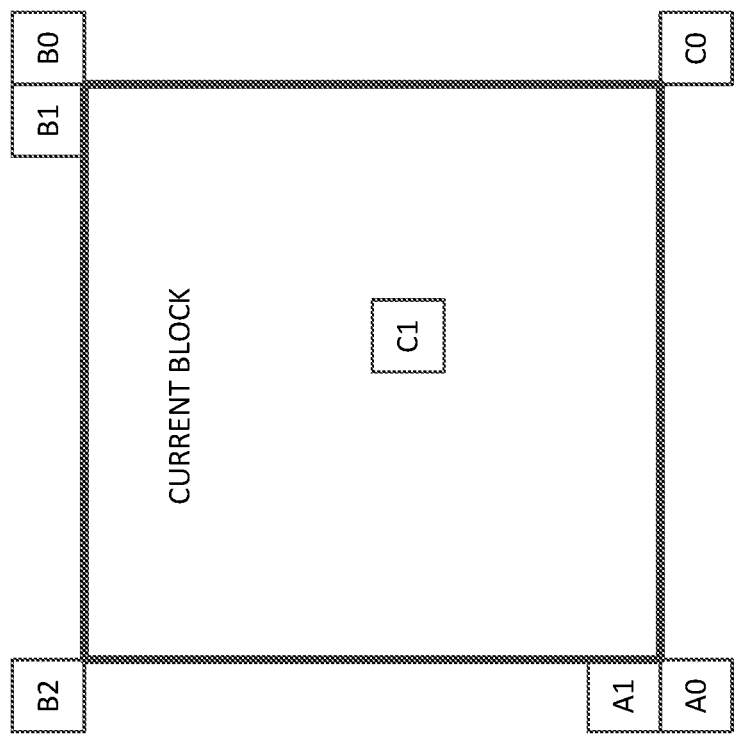
FIG. 8 shows an example of spatial and temporal candidates in some examples.

FIG. 8 shows an example of spatial and temporal candidates in some examples.

For the merge mode in the inter prediction, merge candidates in a candidate list are primarily formed by checking motion information from either spatial or temporal neighboring blocks of the current block. In the FIG. 8 example, candidate blocks A1, B1, B0, A0 and B2 are sequentially checked. When any of the candidate blocks are valid candidates, for example, are coded with motion vectors, then, the motion information of the valid candidate blocks can be added into the merge candidate list. Some pruning operation is performed to make sure duplicated candidates will not be put into the list again. The candidate blocks A1, B1, B0, A0 and B2 are adjacent to corners of the current block, and are referred to as corner candidates.

After spatial candidates, temporal candidates are also checked into the list. In some examples, the current block's co-located block in a specified reference picture is found. The motion information at C0 position (bottom right corner of the current block) of the co-located block will be used as temporal merge candidate. If the block at this position is not coded in inter mode or not available, C1 position (at the outer bottom right corner of the center of the co-located block) will be used instead. The present disclosure provide techniques to further improve merge mode.

The advanced motion vector prediction (AMVP) mode in HEVC refers to using spatial and temporal neighboring blocks' motion information to predict the motion information of the current block, while the prediction residue is further coded. Examples of spatial and temporal neighboring candidates are shown in FIG. 8 as well.

In some embodiments, in AMVP mode, a two-candidate motion vector predictor list is formed. For example, the list includes a first candidate predictor and a second candidate predictor. The first candidate predictor is from the first available motion vector from the left edge, in the order of spatial A0, A1 positions. The second candidate predictor is from the first available motion vector from the top edge, in the order of spatial B0, B1 and B2 positions. If no valid motion vector can be found from the checked locations for either the left edge or the top edge, no candidate will be filled in the list. If the two candidates available and are the same, only one will be kept in the list. If the list is not full (with two different candidates), the temporal co-located motion vector (after scaling) from C0 location will be used as another candidate. If motion information at C0 location is not available, location C1 will be used instead.

In some examples, if there are still no enough motion vector predictor candidates, zero motion vector will be used to fill up the list.

According to aspects of the disclosure, additional candidate blocks that are neighboring to the current block can be checked and added into the candidate list. In some examples, for large blocks or blocks with long sides, there may be more potential merge candidates available along the long sides of a block. The proposed techniques derive additional spatial candidates, if available, into candidate lists.

In some embodiments, the additional spatial merge candidates may be included into the spatial merge candidate list conditionally. In an example, the new candidates can include one or more candidates located in the middle adjacent to the left edge of current block when the height of current block is large than or equal to Y pixels. Further, the new candidates can include one or more candidates located in the middle adjacent to the top edge of current block when the width of current block is large than or equal to X pixels. The new candidates are between corner candidates, and are referred to as side candidates in some examples.

Figure 9A:
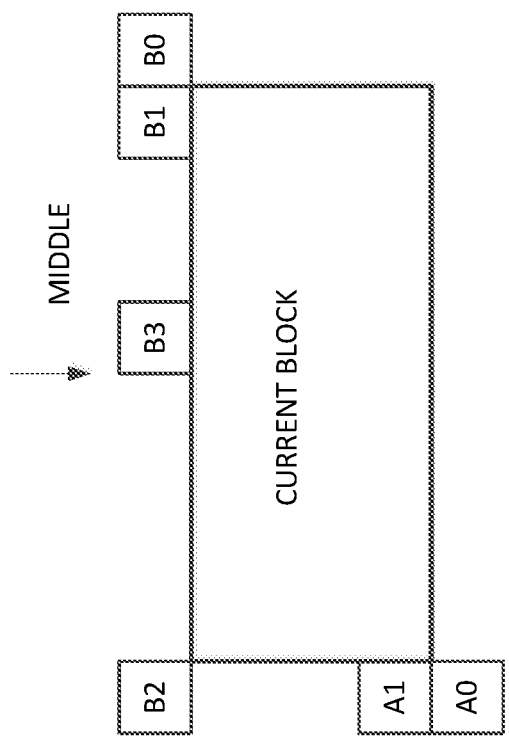
FIGS. 9A and 9B show examples of additional spatial merge candidates according to an embodiment of the disclosure.
Figure 9B:
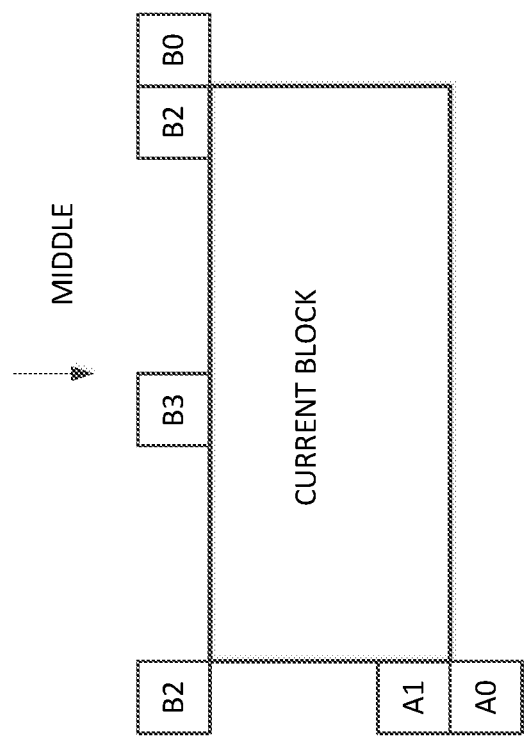

FIGS. 9A and 9B show examples of additional spatial merge candidates according to an embodiment of the disclosure. In the FIGS. 9A and 9B, the width of the current block is larger than or equal to X pixels, and the height of the block is smaller than Y pixel, additional spatial candidate, such as B3, may be checked on top edge of the block. The additional spatial candidate may be prioritized in the order of the candidate list. For example, the order of spatial merge candidate may be {B3, A1, B1, B0, A0, B2}.

Figure 10B:
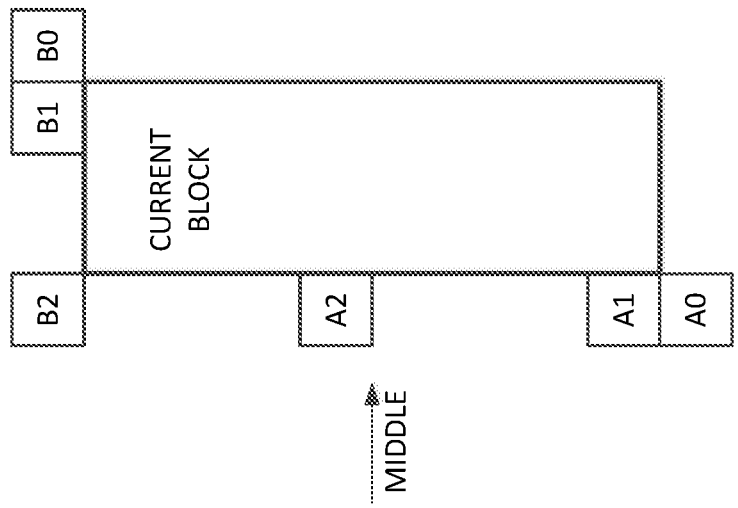
FIGS. 10A and 10B show examples of additional spatial merge candidates according to an embodiment of the disclosure.
Figure 10A:
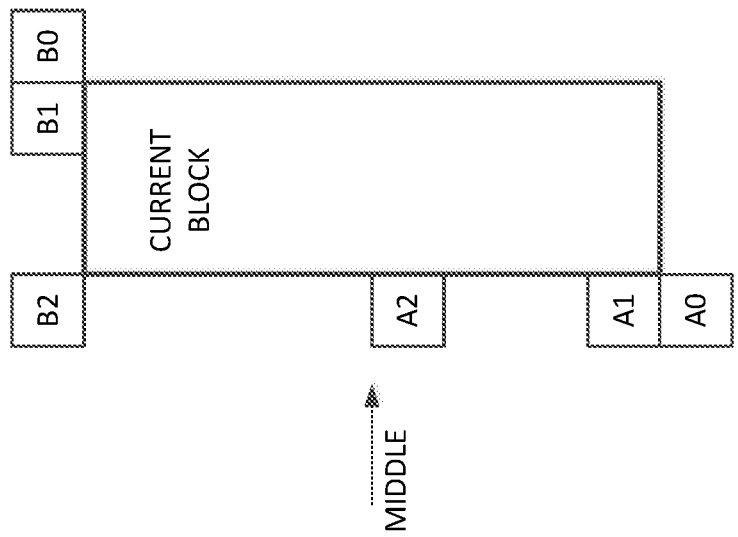

FIGS. 10A and 10B show examples of additional spatial merge candidates according to an embodiment of the disclosure. In the FIGS. 10A and 10B, the height of the block is larger than or equal to Y pixels, and the width of the block is smaller than X pixels, additional spatial candidate, such as A2, may be checked on the left edge of the block. The additional spatial candidate may be prioritized in the order of the candidate list. In an example, the order of spatial merge candidate may be {A2, A1, B1, B0, A0, B2}.

Figure 11:
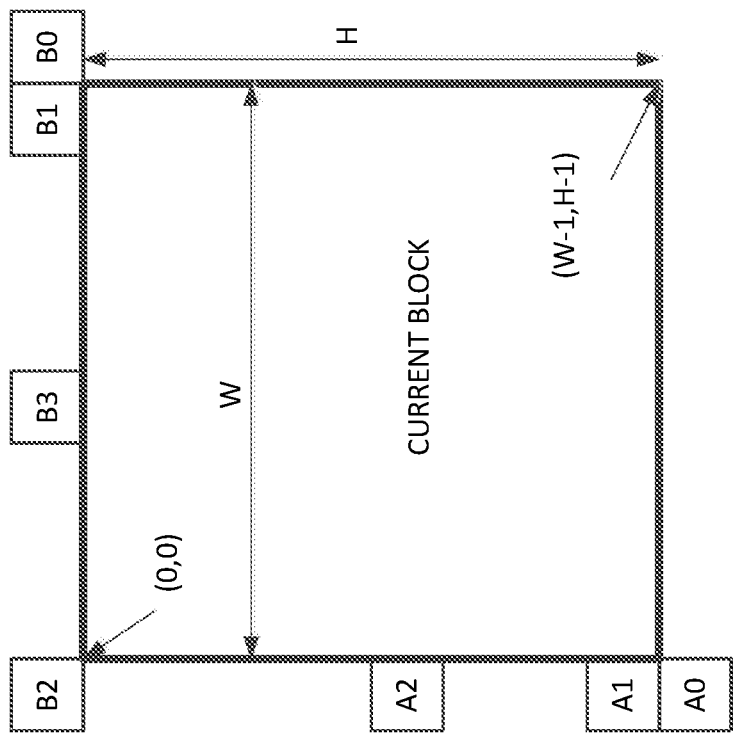
FIG. 11 shows an example of additional spatial merge candidates according to an embodiment of the disclosure.

FIG. 11 shows an example of additional spatial merge candidates according to an embodiment of the disclosure. In the FIG. 11 example, the height of the block is larger than or equal to Y pixels, and the width of the block is larger than or equal to X pixels, additional spatial candidates, such as A2 and B3, may be checked on both top edge and the left edge. The additional spatial candidates may be prioritized in the order of the candidate list. In an example, the order of spatial merge candidate may be {A2, B3, B1, B0, A0, B2}.

In some embodiments, X and Y are positive integer numbers. In an example, X=Y=16. In another example, X and Y are different numbers.

In some examples, to describe the position of each pixel, a coordinate system is utilized. In such system, the pixel at the top-left corner of the block has a coordinate of (0, 0). The pixel at the bottom right corner of the current block has a coordinate of (W−1, H−1), where W denotes the width of the block, and H denotes the height of the block. Let $W_{min}$ denote the minimum width of a block, and let $H_{min}$ denote the minimum height of a block.

The top-middle candidate block (depicted as B3 in FIG. 9A and FIG. 9B) adjacent to the above edge can be at either left side (as shown in FIG. 9B) or right side (as shown in FIG. 9A) of the middle point of top edge of current block. In one embodiment, the position of the bottom-left pixel of top-middle candidate block may be at coordinate (W/2, −1). In another embodiment, the position of bottom-left pixel of top-middle candidate block may be at coordinate (W/2−1, −1).

The middle-left candidate block (depicted as A2 in FIG. 10A and FIG. 10B) adjacent to the left edge can be at either top side (as shown in FIG. 10A) or bottom side (as shown in FIG. 10B) of the middle point of left edge of current block. In one embodiment, the position of the top-right pixel of middle-left candidate block may be at coordinate (−1, H/2). In another embodiment, the position of the top-right pixel of middle-left candidate block may be at coordinate (−1, H/2−1).

In some embodiments, when forming the merge candidate list, the merge candidates at positions A2 and/or B3 are checked first, i.e. before other spatial candidates.

In a scenario, when both A2 and B3 need to be added to the candidate list, in an example, the order of spatial merge candidates on the list may be {A2, B3, A1, B1, B0, A0, B2}; in another example, the order of spatial merge candidates on the list may be {B3, A2, A1, B1, B0, A0, B2}. The spatial candidates other than A2 and B3 may be reordered in the mentioned two examples.

In another scenario, when current condition allows A2 but not B3 to be added to the candidate list, in an example, the order of spatial merge candidates on the list may be {A2, A1, B1, B0, A0, B2}. The spatial candidates other than A2 may be reordered in this example.

In another scenario, when current condition allows B3 but not A2 to be added to the candidate list, in an example, the order of spatial merge candidates on the list may be {B3, A1, B1, B0, A0, B2}. The spatial candidates other than B3 may be reordered in this example.

During the process of forming the merge candidate list, if a candidate at a position is unavailable (not coded in inter mode or not exist), the candidate will not be added to the candidate list. If there is a candidate on the constructed list which has the same or similar motion information as the one derived, the derived one will not be added to the candidate list to avoid redundancy.

Various techniques can be used to determine similarity of motion information between a candidate A and a candidate B. In an embodiment, when the motion vectors in the candidate A and the candidate B point to the same reference picture, and the absolute difference of the x component and/or y component of the motion vectors for the two candidates are smaller than or equal to a given threshold, the motion vectors of the candidate A and candidate B are similar. In an example, the threshold can be 1 integer pixel.

In another embodiment, the motion vectors in the candidate A and the candidate B can point to different reference pictures. In an example, scaling operation is performed to adjust the motion vectors to point to a common reference picture. After the scaling operation, when the absolute difference of the x component and/or y component of the adjusted motion vectors for the two candidates are smaller than or equal to a given threshold, the motion vectors of the candidate A and the candidate B are similar. In an example, the threshold can be 1 integer pixel.

According to some aspect of the disclosure, more than one side candidates can be inserted into the spatial merge candidate list when size(s) of of current block is(are) greater than a size threshold.

In some embodiments, when the height H of the current block is larger than or equal to Y pixels, multiple additional spatial merge candidates which are adjacent to the left edge of current block may be added, and starting from existing candidate A1.

Figure 12:
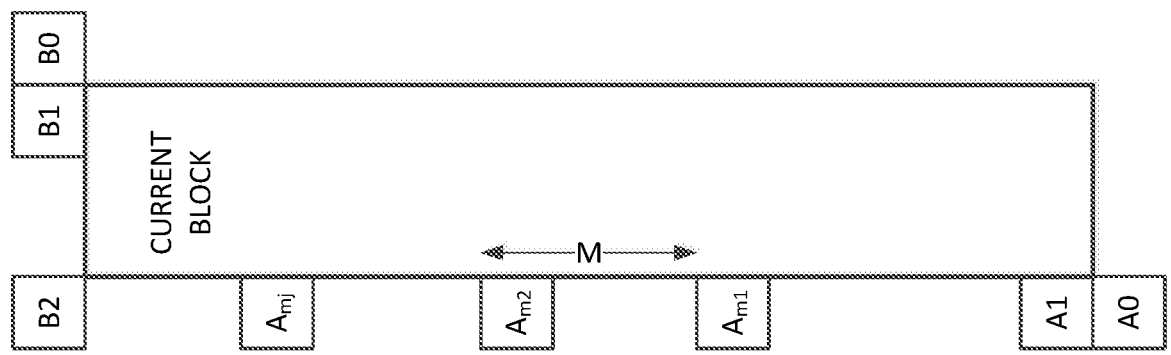
FIG. 12 shows an example of adding side candidates according to an embodiment of the disclosure.

FIG. 12 shows an example of adding side candidates according to an embodiment of the disclosure. In the FIG. 12 example, for every M pixels upwards, a new candidate is added. Let H denote the height of current block, Amj denote the jth (counting from bottom to top) additional spatial candidates on the left, where $j \in [0, \lfloor H/M \rfloor]$. The representative positions of each candidate block (Amj) can be described by coordinate of its top-right pixel, which can be either on the top or below sides of the dividing points:

$(-1, H-M \times j+H\_\min)$ or $(-1, H-M \times j)$

In some embodiments, when width W of the current block is larger than or equal to X pixels, multiple additional spatial merge candidates which are adjacent to the top edge of current block may be added, and starting from existing candidate B1.

Figure 13:
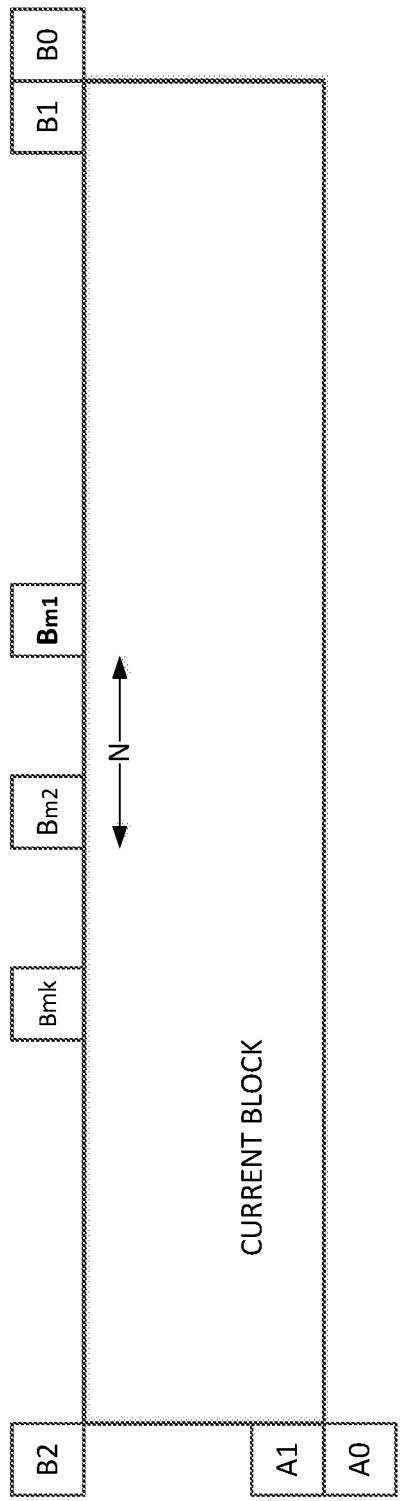
FIG. 13 shows an example of adding side candidates according to an embodiment of the disclosure.

FIG. 13 shows an example of adding side candidates according to an embodiment of the disclosure. In the FIG. 13 example, for every N pixels leftwards, a new candidate is added. Let W denote the width of current block, Bmk denote the kth (counting from right to left) additional spatial candidates on the top edge of current block, where $k \in [0, \lfloor W/N \rfloor]$. The representative positions of each candidate block (Bmk) can be described by coordinate of its bottom-right pixel, which can be either on the left or right sides of the dividing points:

$(W-N \times k-W\_\min, -1)$ or $(W-N \times k, -1)$

In some embodiments, when the height H of the current block is larger than or equal to Y pixels, and the width W of the current block is larger than or equal to X pixels, multiple additional spatial merge candidates are added for both left side and top side.

Figure 14:
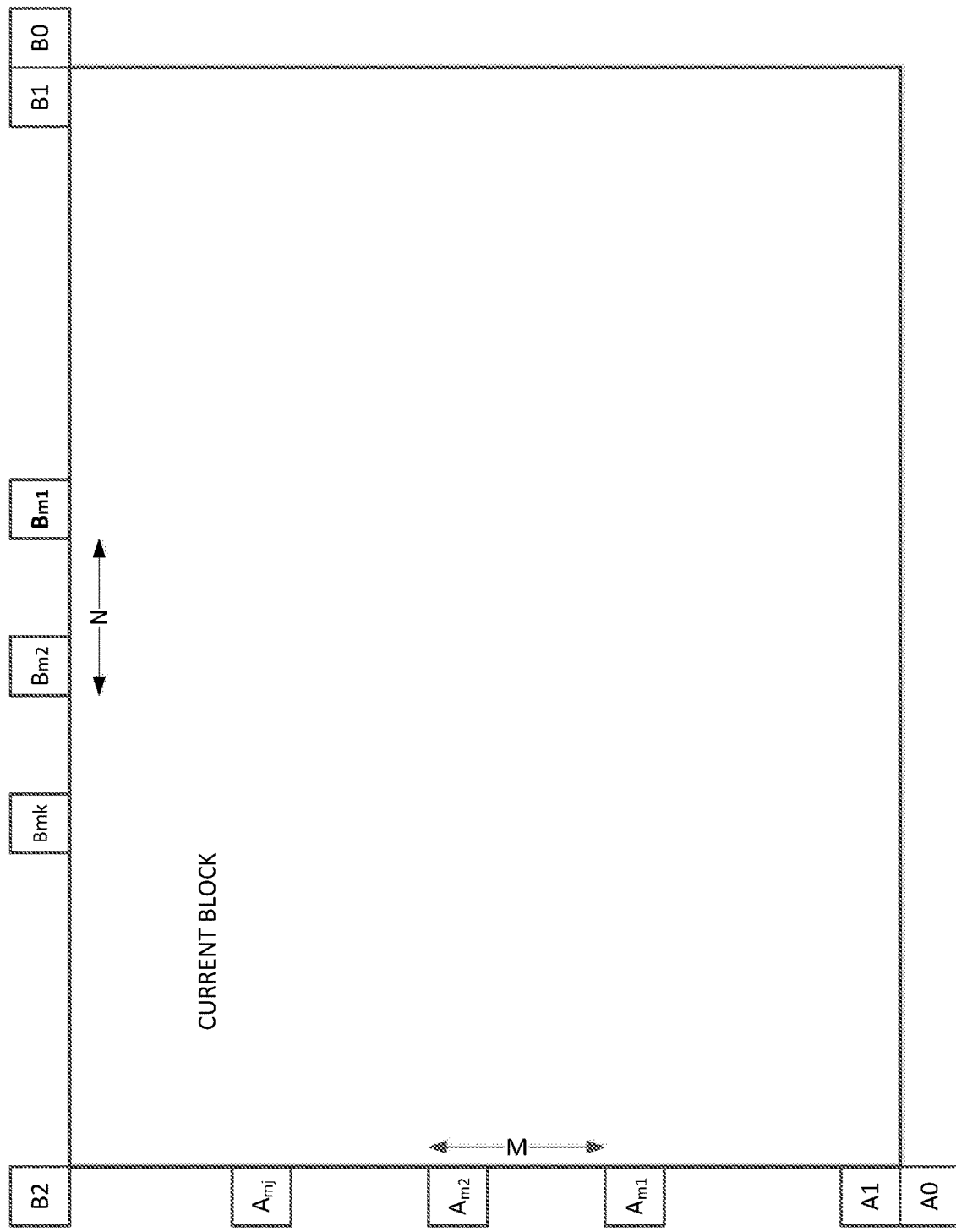
FIG. 14 shows an example of adding side candidates from both left side and the top side of the current block according to an embodiment of the disclosure.

FIG. 14 shows an example of adding side candidates from both left side and the top side of the current block according to an embodiment of the disclosure.

For blocks with large width or height, the number of new additional spatial merge candidates may be significantly larger than the original maximum number of merge candidates currently used in HEVC. In some examples, the maximum number of merge candidates is increased based on the number of available spatial candidates and temporal merge candidates.

In one embodiment, the number of total available merge candidates for current block, including spatial and temporal, may be used as maximum number of merge candidates.

In another embodiment, the width and height of current block may be used to determine the maximum number of merge candidates. Let Cmax denote the max number of candidates, W denotes block width, H denotes block height. In an example, Cmax is defined by Eq. 1:

$$C_{max} = \frac{W}{a} + \frac{H}{b} + c \qquad \text{Eq. 1}$$

where a, b, and c are integer values. In one example, a=8, b=8, c=1. Other values may be used for a, b, and c.

In another example, Cmax is defined by Eq. 2:

$$C_{max} a^* \log_n W + b^* \log_n H + c \qquad \text{Eq. 2}$$

where a, b, c, and n are integer values. In one example, a=1, b=1, c=1, n=2. Other values may be used for a, b, c, and n.

During the process of forming the merge candidate list, if a candidate at a position is unavailable (not coded in inter mode or not exist), the candidate will not be added to the candidate list. If there is a candidate on the constructed list which has the same or similar motion information as the one derived, the derived one will not be added to the candidate list to avoid redundancy.

Various techniques can be used to determine similarity of motion information between a candidate A and a candidate B. In an embodiment, when the motion vectors in the candidate A and the candidate B point to the same reference picture, and the absolute difference of the x component and/or y component of the motion vectors for the two candidates are smaller than or equal to a given threshold, the motion vectors of the candidate A and candidate B are similar. In an example, the threshold can be 1 integer pixel.

In another embodiment, the motion vectors in the candidate A and the candidate B can point to different reference pictures. In an example, scaling operation is performed to adjust the motion vectors to point to a common reference picture. After the scaling operation, when the absolute difference of the x component and/or y component of the adjusted motion vectors for the two candidates are smaller than or equal to a given threshold, the motion vectors of the candidate A and the candidate B are similar. In an example, the threshold can be 1 integer pixel.

It is noted that the above disclosed techniques to provide additional spatial candidates in a candidate list can be used in any suitable mode that uses a candidate list.

According to some aspects of the disclosure, the techniques to provide additional spatial candidate in a candidate list can be used in the AMVP mode in which the residues of the motion vector prediction are signaled in the bitstream.

In an embodiment, when the height of a current block is large than or equal to Y pixels, a spatial candidate A2 located in the middle adjacent to the left edge of the current block, such as shown in FIG. 10A and FIG. 10B, can be suitably checked and added into the candidate list if valid. In an example, the spatial candidate A2 is located above of the middle point adjacent to the left edge of the current block as shown in FIG. 10A. In another example, the spatial candidate A2 is located below of the middle point adjacent to the left edge of the current block, as shown in FIG. 10B.

In another embodiment, when the width of a current block is large than or equal to X pixels, a spatial candidate B3 located in the middle adjacent to the top edge of the current block, such as shown in FIG. 9A and FIG. 9B, can be suitably checked and added into the candidate list if valid. In an example, the spatial candidate B3 is located on the left side of the middle point adjacent to the top edge of current block, as shown in FIG. 9B. In another example, the spatial candidate B3 is located on the right side of the middle point adjacent to the top edge of the current block as shown in FIG. 9A.

In above descriptions, X and Y are integer numbers. In one example, X=Y=16. In another example, X and Y may different numbers.

It is noted that, in the AMVP mode, the motion vector predictor without scaling can be checked first, and if no valid candidate, the scaled motion vector predictor can be checked. In an embodiment, the width of the current block is larger than or equal to X pixels, and the height of the current block is smaller than Y pixel, additional spatial AMVP candidate may be checked only on top edge of the block. In an example, the checking order of AMVP candidates for the above side of the current block may be {B3, B0, B1, B2, scaled B3, scaled B0, scaled B1, scaled B2}.

In another embodiment, the height of the current block is larger than or equal to Y pixels, and the width of the current block is smaller than X pixels, additional spatial AMVP candidate may be checked only on the left edge of the block. The checking order of AMVP candidate for the left side of the current block may be {A2, A0, A1, scaled A2, scaled A0, scaled A1}.

In another embodiment, the height of the current block is larger than or equal to Y pixels, and the width of the current block is larger than or equal to X pixels, additional spatial AMVP candidates may be checked on both top edge and the left edge.

For each side there may be up to six cases that can be used as motion vector candidate, with three cases not required to use spatial scaling, and three cases where spatial scaling is used. For example, when A2 is available on the left edge of current block, the checking order of AMVP candidate for the left side of the current block may be {A2, A0, A1, scaled A2, scaled A0, scaled A1}. In another example, when B3 is available, the checking order of AMVP candidate for the above side of the current block may be {B3, B0, B1, B2, scaled B3, scaled B0, scaled B1, scaled B2}.

When new spatial candidates are added into the motion vector predictor list for AMVP mode, various techniques can be used to form the final MV predictor candidates.

In an embodiment, one of the candidates from the left edge will become a first MV predictor while one of the candidates from the top edge will become a second MV predictor. The first available candidate of the edge will be selected, using a predefined checking order. In an example, the checking order for the left edge is A0, A1, A2, . . . , along the direction from bottom to the top; the checking order for the top edge is B0, B1, B3, B2, . . . , along the direction from right to left. In another example, the checking order for the left edge is A2, A0, A1, . . . , along the direction from bottom to the top but putting the middle candidate at first; the checking order for the top edge is B3, B0, B1, B2, . . . , along the direction from right to left but putting the middle candidate at first.

In another embodiment, several candidates from both top and left edges will form a list. The first N available candidates in the list will be selected as the MV predictors for a current block. N is a positive integer number. It is set to 2 in one embodiment. It can be set to other numbers as well. The checking order of both top and left edges is predefined and can have different variations. In an example, the checking order for the list can be: {B3, A2, A1, B1, B0, A0, B2}. In another example, the checking order for the list can be: {A2, B3, A1, B1, B0, A0, B2}. In another example, the checking order for the list can be: {B3, A2, B1, A1, B0, A0, B2}. In another example, the checking order for the list can be: {A2, B3, B1, A1, B0, A0, B2}. In above examples, if the length of either left or above edge does not meet the requirement, the candidate (A2 or B3) will not be added into the list. Further, in the above examples, the checking orders for spatial candidates other than A2 and B3 can be re-arranged.

Figure 15:
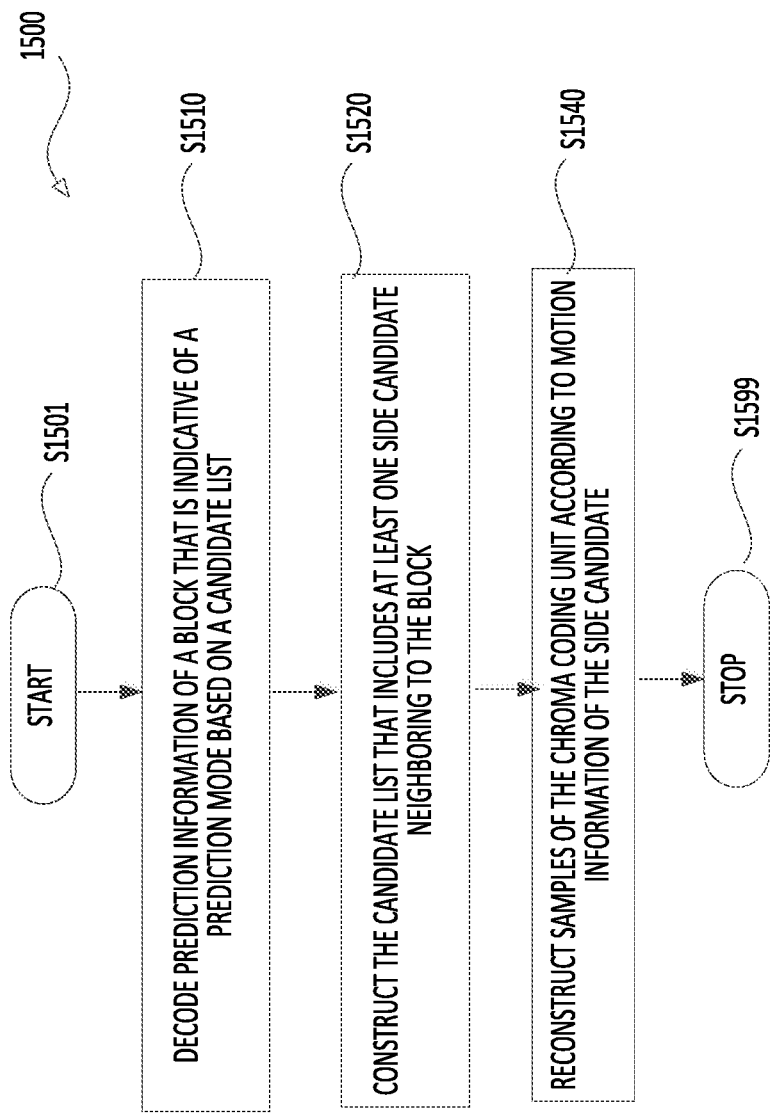
FIG. 15 shows a flow chart outlining a process example according to some embodiments of the disclosure.

FIG. 15 shows a flow chart outlining a process (1500) according to an embodiment of the disclosure. The process (1500) can be used in the reconstruction of a block coded in intra mode, so to generate a prediction block for the block under reconstruction. In various embodiments, the process (1500) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1500) is implemented in software instructions, thus when the processing circuitry executes the software instructions, the processing circuitry performs the process (1500). The process starts at (S1501) and proceeds to (S1510).

At (S1510), prediction information of a block is decoded from a coded video bitstream. The prediction information is indicative of a prediction mode, such as a merge mode, an AMVP mode, and the like that is based on a candidate list.

At (S1520), a candidate list is constructed in response to the prediction mode. The candidate list includes at least a side candidate that is located at a neighboring position to the block, such as between corner candidates and adjacent to left edge of the block, between corner candidate and adjacent to top edge of the block.

At (S1530), samples of the block are reconstructed according to the motion information of the side candidate. Then, the process proceeds to (S1599) and terminates.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
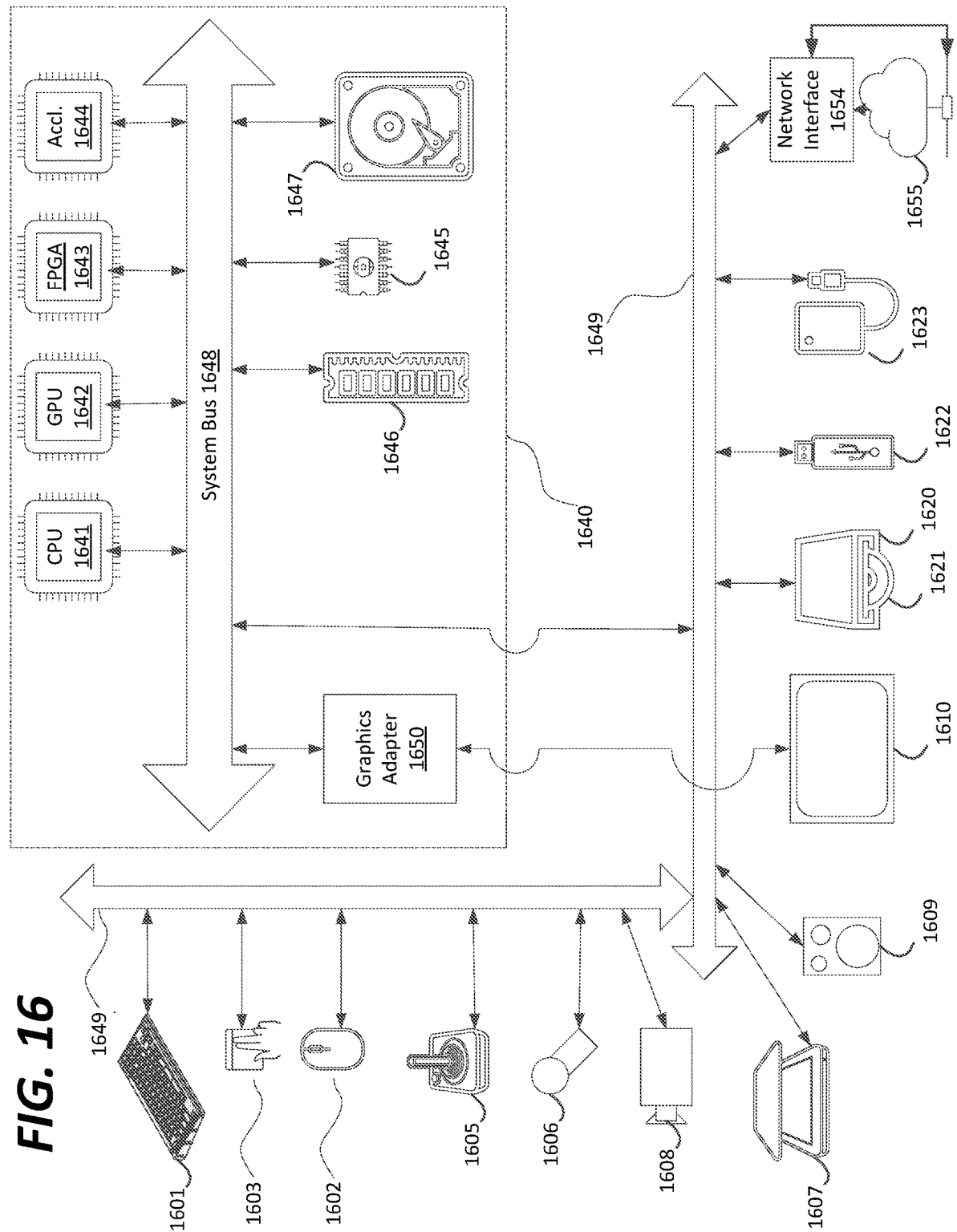
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like. CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding, comprising:
decoding prediction information of a current block from a coded video bitstream, the prediction information being indicative of a prediction mode that is based on a candidate list;
constructing, in response to the prediction mode, the candidate list including a plurality of side candidates that are evenly spaced along a same side of the current block and disposed between corners of the current block, the spacing of neighboring side candidates of the plurality of side candidates being equal to a spacing between one of the corners of the current block and one of the plurality of side candidates; and
reconstructing at least one sample of the current block according to motion information of the one of the plurality of side candidates,
wherein the one of the plurality of side candidates disposed between the corners of the current block is checked before corner candidates that are adjacent to the corners of the current block in the construction of the candidate list.

2. The method of claim 1, wherein the prediction mode is one of a merge mode and an advanced motion vector prediction (AMVP) mode.

3. The method of claim 1, wherein the plurality of side candidates includes a left side candidate that is located at a left side middle position neighboring to the current block when a height of the current block is larger than a height threshold.

4. The method of claim 1, wherein the plurality of side candidates includes a top side candidate that is located at a top side middle position neighboring to the current block when a width of the current block is larger than a width threshold.

5. The method of claim 1, wherein the plurality of side candidates are left side candidates that are evenly spaced by a plurality of pixels at a left edge neighboring to the current block when a height of the current block is larger than a height threshold.

6. The method of claim 1, wherein the plurality of side candidates are top side candidates that are evenly spaced by a plurality of pixels at a top edge neighboring to the current block when a width of the current block is larger than a width threshold.

7. The method of claim 1, wherein the one of the plurality of side candidates is prioritized ahead of other candidates in the candidate list.

8. The method of claim 1, further comprising:
prioritizing a left side candidate before a top side candidate in the candidate list based on an order of the left side candidate in the candidate list.

9. The method of claim 1, further comprising:
when the prediction mode is an advanced motion vector prediction (AMVP) mode, prioritizing a left side candidate before a top side candidate based on an order of the left side candidate in the candidate list.

10. The method of claim 1, further comprising:
prioritizing a top side candidate before a left side candidate in the candidate list based on an order of the top side candidate in the candidate list.

11. A video decoder for video decoding, comprising:
processing circuitry configured to:
decode prediction information of a current block from a coded video bitstream, the prediction information being indicative of a prediction mode that is based on a candidate list,
construct, in response to the prediction mode, the candidate list including a plurality of side candidates that are evenly spaced along a same side of the current block and disposed between corners of the current block, the spacing of neighboring side candidates of the plurality of side candidates being equal to a spacing between one of the corners of the current block and one of the plurality of side candidates; and
reconstruct at least one sample of the current block according to motion information of the one of the plurality of side candidates,
wherein the one of the plurality of side candidates disposed between the corners of the current block is checked before corner candidates that are adjacent to the corners of the current block in the construction of the candidate list.

12. The video decoder of claim 11, wherein the prediction mode is one of a merge mode and an advanced motion vector prediction (AMVP) mode.

13. The video decoder of claim 11, wherein the plurality of side candidates includes a left side candidate that is located at a left side middle position neighboring to the current block when a height of the current block is larger than a height threshold.

14. The video decoder of claim 11, wherein the plurality of side candidates includes a top side candidate that is located at a top side middle position neighboring to the current block when a width of the current block is larger than a width threshold.

15. The video decoder of claim 11, wherein the plurality of side candidates are left side candidates that are evenly spaced by a plurality of pixels at a left edge neighboring to the current block when a height of the current block is larger than a height threshold.

16. The video decoder of claim 11, wherein the plurality of side candidates are top side candidates that are evenly spaced by a plurality of pixels at a top edge neighboring to the current block when a width of the current block is larger than a width threshold.

17. The video decoder of claim 11, wherein the one of the plurality of side candidates is prioritized ahead of other candidates in the candidate list.

18. The video decoder of claim 11, wherein the processing circuitry is further configured to prioritize a left side candidate before a top side candidate in the candidate list based on an order of the left side candidate in the candidate list.

19. The video decoder of claim 11, wherein the processing circuitry is further configured to, when the prediction mode is an advanced motion vector prediction (AMVP) mode, prioritize a left side candidate before a top side candidate based on an order of the left side candidate in the candidate list.

20. A non-transitory computer readable medium having instructions stored therein, which when executed by a processor in a video decoder causes the processor to execute a method comprising:
decoding prediction information of a current block from a coded video bitstream, the prediction information being indicative of a prediction mode that is based on a candidate list;
constructing, in response to the prediction mode, the candidate list including a plurality of side candidates that are evenly spaced along a same side of the current block and disposed between corners of the current block, the spacing of neighboring side candidates of the plurality of side candidates being equal to a spacing between one of the corners of the current block and one of the plurality of side candidates; and
reconstructing at least one sample of the current block according to motion information of the one of the plurality of side candidates,
wherein the one of the plurality of side candidates disposed between the corners of the current block is checked before corner candidates that are adjacent to the corners of the current block in the construction of the candidate list.

* * * * *